Aug. 7, 1951  T. D. BOWES ET AL  2,563,577
DYNAMO-ELECTRIC APPARATUS
Filed Nov. 19, 1949  3 Sheets-Sheet 1
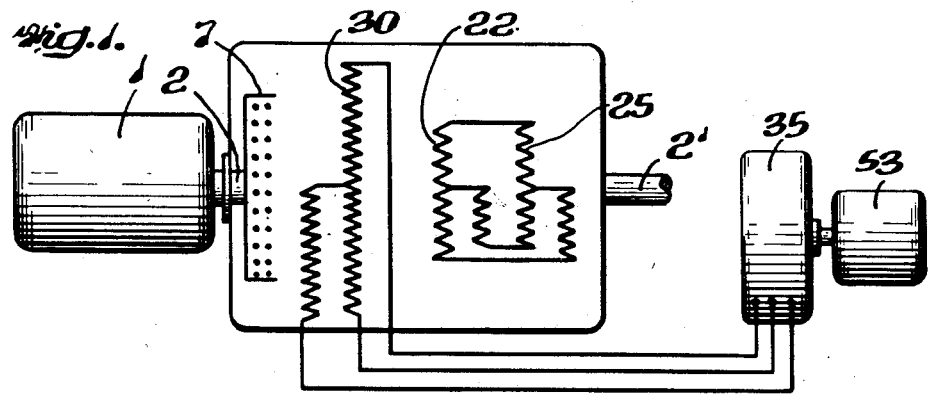
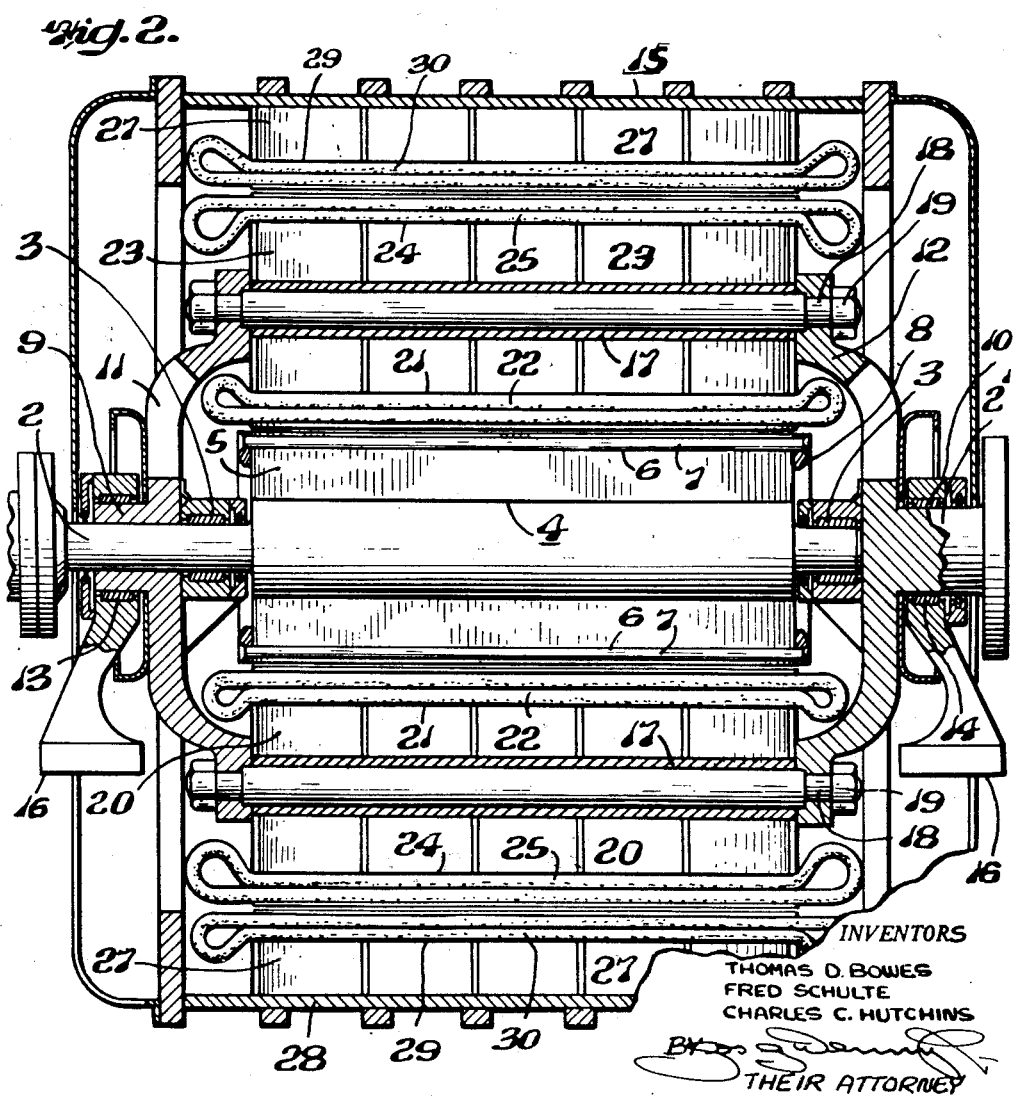
INVENTORS
THOMAS D. BOWES
FRED SCHULTE
CHARLES C. HUTCHINS
THEIR ATTORNEY

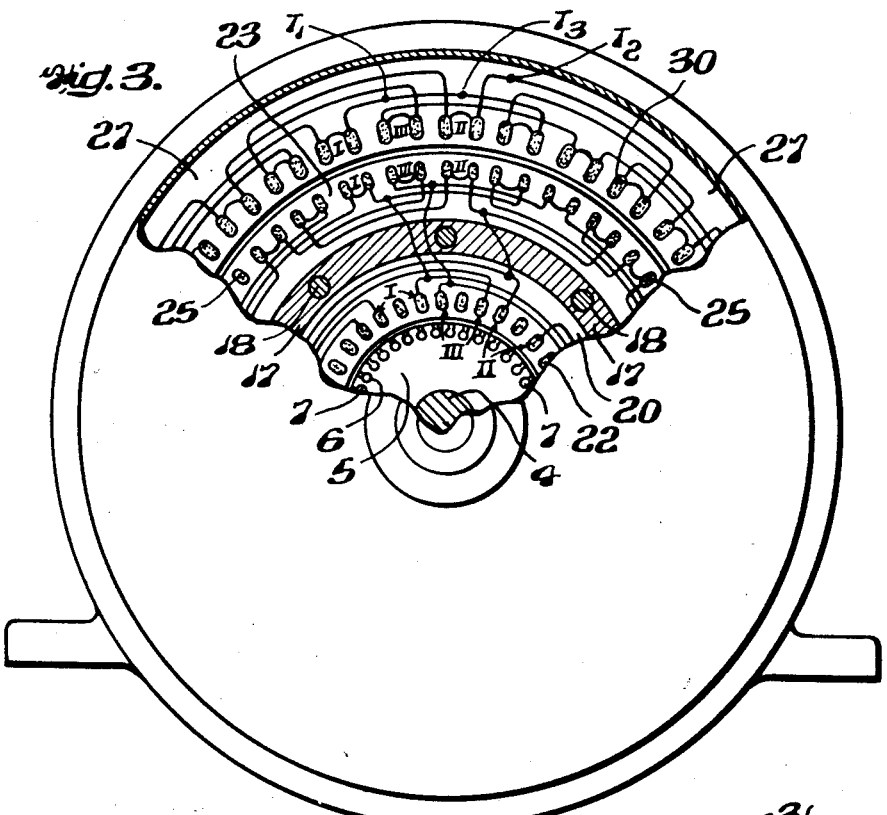
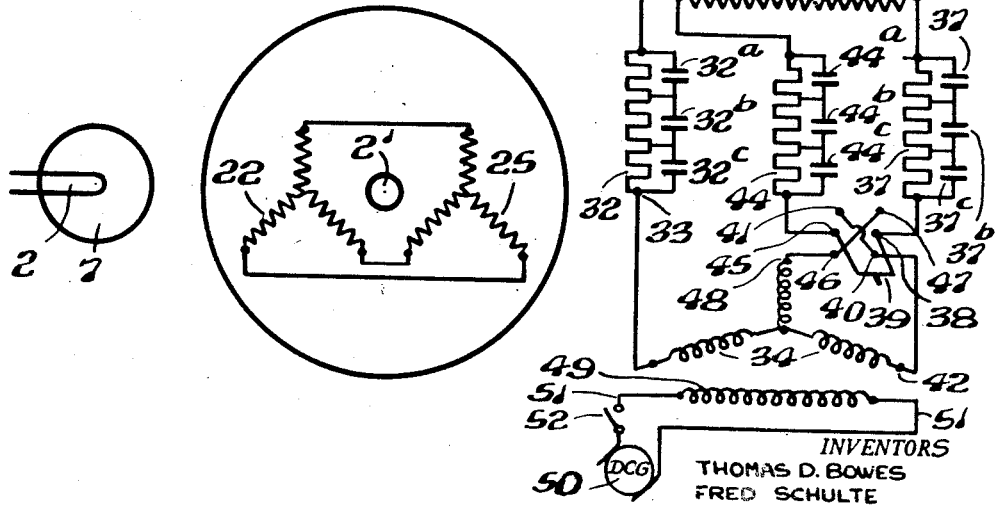

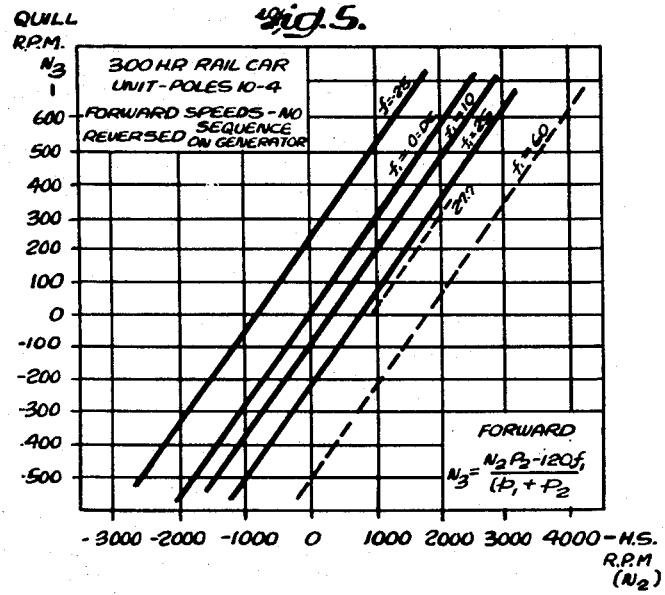
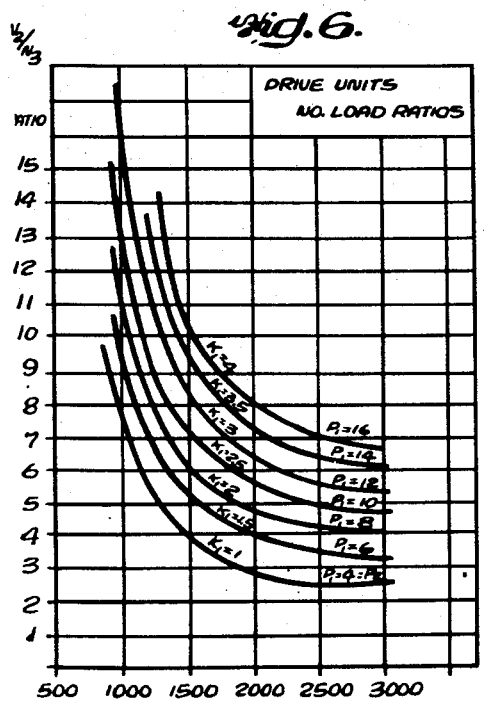
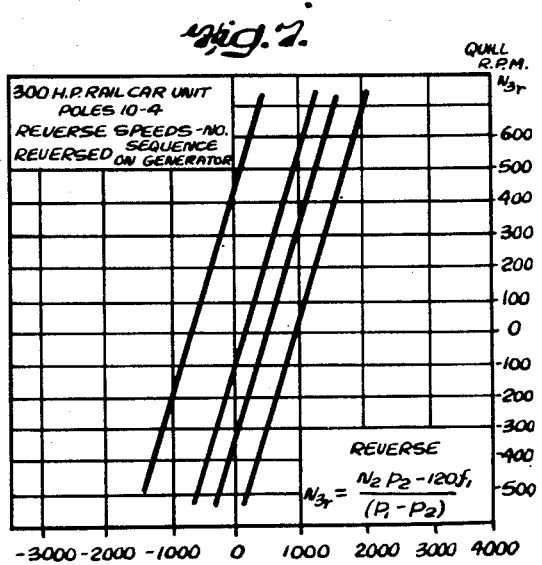

Patented Aug. 7, 1951

2,563,577

UNITED STATES PATENT OFFICE 2,563,577

DYNAMOELECTRIC APPARATUS

Thomas D. Bowes, Cynwyd, Fred Schulte, Philadelphia, and Charles C. Hutchins, Ridgway, Pa.; said Schulte and said Hutchins assignors to said Bowes Application November 19, 1949, Serial No. 128,318

6 Claims. (Cl. 172—284)

1

This invention is an improved dynamo-electric apparatus of the general type shown in Letters Patent No. 2,465,006, of March 22, 1949, to Bowes et al. By this invention energy may be transmitted from a driving shaft to a driven shaft and the ratio of speed and torque between the driving shaft and the driven shaft is automatically increased and diminished with decreases and increases in the speed of the driving shaft and such ratio may be selectively varied independently of the speed of the driven shaft and independently of the load on the driven shaft, throughout the range of operation of the apparatus, without unreasonable loss of efficiency, and preferably without the use of slip rings, or of commutators, or of any mechanical connection between the driving shaft and the driven shaft.

In a preferred embodiment of the invention, the magnetizable, laminated core of a stator has wound thereon polyphase windings arranged to form the multi-pole primary of an induction motor in which a rotating magnetic field is set up by polyphase alternating current supplied thereto by a main exciter of variable frequency; the exciter preferably having stationary phase windings connected in phase relation with the stationary phase windings of the principal stator. A reversing switch and variable resistances may be interposed between the stationary windings of the exciter and stator.

A rotor or spinner, fixed to a power output shaft, is rotatable within the stator, and carries, on its outer periphery, a magnetizable, laminated core which contains polyphase windings complementary to the windings of the stator and forming the secondary of the induction motor. These rotor windings are arranged to form on the rotor, poles which are equal in number and complementary to the poles formed on the stator by the magnetic flux generated in the core thereof, so that the poles of the stator and rotor form a set of primary magnetic circuits.

A further laminated core is mounted on the inner periphery of the rotor and contains the secondary of an induction alternator which forms a closed electric circuit with the primary of the motor. The alternator secondary comprises polyphase windings directly connected in series with the primary windings of the motor and so arranged in the alternator core as to form a fewer number of poles than are formed by the primary of the motor.

A second rotor, fixed to a power input shaft, is rotatably within the first rotor and carries, on

2 its outer periphery, an induction alternator primary which is complementary to the alternator secondary. The alternator primary comprises conductors forming an inductive winding such as a squirrel cage consisting of conducting bars connected together by conducting end rings to form closed circuits or conductors forming phase windings.

The primary and secondary of the alternator form a second set of primary magnetic circuits which are not mutual to the magnetic circuits of the induction motor, but the connected windings on the outer rotor form an electric circuit common to the generator and motor and link together poles of the alternator and motor.

When there is no excitation of the motor stator winding, the rotation of the power input shaft causes the innermost rotor to rotate idly and no torque is applied to the outer rotor or to the power output shaft connected therewith. When a polyphase alternating current is supplied to the motor stator winding, a rotating magnetic field is formed in that stator core; the speed of rotation of the magnetic field being a function of the frequency of the current and the number of poles for which the stator is wound. The cutting of the flux of the rotating field by the conductors of the motor windings on the outer periphery of the spinner causes a flow of current therethrough and through the alternator windings connected therewith to generate magnetic flux which is cut by the inductive windings on the high speed inner rotor. The current thereby caused to flow in these inductive windings causes the formation of magnetic poles complementary to the poles of the alternator secondary, with consequent generation of current in the latter. The current thus generated flows to the primary winding of the motor to furnish torque thereto and rotate the motor rotor at a speed which is a function of the number of motor poles and the frequency of the current. The current frequency is the same in both spinner element windings.

The principles of the invention, and the best mode in which we have contemplated applying such principles, will further appear from the following description and the accompanying drawings in illustration thereof.

In the drawings, Fig. 1 is a diagrammatic illustration of a plant embodying the invention; Fig. 2 is a somewhat diagrammatic longitudinal sectional view of the dynamo-electric machine comprised in the invention; Fig. 3 is a transverse sectional view on the line 3—3 of Fig. 2; Fig. 4 is a schematic wiring diagram illustrating the electrical circuits of the apparatus; and Figs. 5, 6 and 7 are diagrams illustrating results from variations in construction and operation of the apparatus.

In the embodiment of the invention illustrated in the drawings, there is shown a prime mover 1, such as a Diesel engine or high speed turbine, which is connected to and rotates a power input shaft 2. This shaft is journalled in and supported by bearings 3 and has an enlarged section between the bearings. A squirrel cage type induction alternator rotor 4 is fixed to the enlarged section and comprises a laminated magnetizable core 5 containing slots 6 for the reception of conducting bars 7 which are electrically connected to the conducting end rings 8 to form a closed circuit.

Trunnions 9 and 10 of spiders 11 and 12 are journalled in bearings 13 and 14 of a frame or housing 15 supported by feet 16. The shaft 2 is concentric with the trunnions 9 and 10 and passes freely through and is rotatable in a bore in the spider 11 and trunnion 9.

The trunnion 10 is connected with work through a power output shaft 2'.

A cylindrical support 17 is clamped between the spiders 11 and 12 by bolts 18 and nuts 19 to form a rotatable quill or spinner surrounding, and co-axial with, the rotor on the shaft 2.

A laminated, magnetizable core 20 is fixed to the inner periphery of the quill member 17. The concavely cylindrical face of the core 20 is in close juxtaposition to, but spaced by an air gap from, the outer cylindrical face of the core 5. The core 20 contains a series of axially extending slots 21 in which are seated polyphase windings which may be of Y, delta or other form to form, for example, phase windings I, II and III. The conductors of the windings 22 are so disposed in the slots 21 as to form a number of alternate poles upon the passage of alternating polyphase current therethrough.

A laminated, magnetizable core 23 is fixed to the external periphery of the quill member 17 and contains a series of axially extending slots 24 in which are seated a polyphase winding 25 which may be of Y, delta or other form to form a second set of phase windings I, II and III. The conductors of the winding 25 are so disposed in the slots 24 as to form alternate poles upon the passage of alternating polyphase current therethrough. The number of poles formed by the winding 25 is preferably greater than the number of poles formed by the winding 22. The windings 22 and 25 are connected at their corresponding phase terminals and form a closed circuit.

A laminated, magnetizable core 27 is fixed to a stator frame 28 and has a concavely cylindrical face in close juxtaposition to, but spaced by an air gap from, the outer cylindrical face of the core 23. The core 27 contains a series of axially extending slots 29 in which is seated a polyphase winding 30, which may be of Y, delta or other form, to form a third set of phase windings I, II, and III. The conductors of the winding 30 are so disposed in the slots 29 as to form alternate poles upon the passage of alternating polyphase current therethrough. The number of poles formed by the windings 30 are the same as the number of poles formed by the motor windings 25 and, consequently, greater than the number of poles formed by the generator winding 22.

A phase terminal 31 at any suitable point $T_1$ on the stator winding 30 is connected, through starting and control resistances 32, with a corresponding phase terminal 33 of a polyphase armature winding 34 of a synchronous main exciter or magnetizing machine 35. Sections of the resistances 32 may be short-circuited out at appropriate times by closing switches 32a, 32b and 32c connected in parallel with the respective resistances.

A sequential phase terminal 36 at any suitable point $T_2$ on the stator winding 30 is connected, through starting and control resistances 37, with a terminal 38 of a reversing switch 39, which has interconnected terminals 40 and 41 connected with the phase terminal 42 of the exciter armature winding 34. Sections of the resistances 37 may be short-circuited at appropriate times by closing switches 37a, 37b, and 37c connected in parallel with the respective resistances.

A sequential phase terminal 43 at any suitable point $T_3$ on the stator winding 30 is connected, through starting and control resistances 44, with a terminal 45 of the reversing switch 39, which has interconnected terminals 46 and 47 connected with the phase terminal 48 of the exciter armature winding 34. Sections of the resistances 44 may be short-circuited at appropriate times by closing switches 44a, 44b and 44c, connected in parallel with the respective resistances.

The main exciter 35 has a field winding 49 rotatable in close juxtaposition to the stationary winding 34 and supplied with direct current, from any suitable source 50, through conductors 51 and a controlling switch 52.

The exciter winding 49 is rotatable by a variable speed device 53, such as a motor, turbine or the like.

In the operation of the apparatus, the prime mover 1 rotates the shaft 2 and the alternator rotor 4 at a high rate of speed. The switch 52 is positioned to supply direct current to the magnetizer field winding 49. The device 53 rotates the winding 49 at such speed relative to the stationary winding 34 of the exciter 35 as will generate in the windings 34 a current of desired frequency, which may be varied by appropriately adjusting the speed of the exciter driving device 53.

The current generated in the windings 34 flows to and through the windings 30 subject to the control of the rheostats 32, 37 and 44 and the switches associated therewith, and to the control of the switch 39. By positioning the switch 39 in contact with the pair of switch terminals 40, 46 or in contact with the pair of switch terminals 41, 47 the sequence of the polarities in the windings 30 may be varied, with consequent change in the direction of rotation of the poles of the magnetic field created in the core 27 by the flow of current through the windings 30.

When current flows from the magnetizer 35 through the stator windings 30, flux appears in the respective cores 23, 20 and 5 and the lines of magnetic force in the magnetic circuits are cut by the respective conductors 30, 25, 22 and 7.

As a result of the rotation of the poles formed in the core 27 and the flux emanating therefrom and as a result of the rotation of the core 5 by the prime mover, a torque is created tending to turn the intermediate spinner 17 carrying the cores 20 and 23 in the same direction as the core 5, but at a much lower speed. The torque produced is a function of the amount of excitation current, which, depending upon the speeds of rotation, governs the internal voltages, which, in turn, cause currents to flow through the effective impedances. The reactions between these currents and the magnetic fluxes provide electrical and mechanical torque as in a usual induction machine and the power transmitted from the power input shaft 2 to the power output shaft 2' is equivalent to the power mechanically supplied by the prime mover to the shaft 2 less the internal electrical losses of the mechanism.

The resistances 32, 37 and 44 are preferably left in circuit during the starting of the apparatus, so as to cause the motor elements to perform in accordance with the characteristics of a wound rotor induction motor, and as the speed of the core 5 builds up toward normal the resistances 32, 37 and 44 are successively cut out by closing the respective switches in parallel with these resistances. The customary extra losses usually associated with wound rotor motor operation appear in the resistances 32, 37 and 44 during the closing cycle of the associated switches.

The current generated in the windings 22 by the rotation of the core 5 furnishes the principal source of power to the windings 25 of the induction motor, and conditions stabilize when the generator and motor secondary frequencies become equal and the relative rates of rotation of the high-speed shaft 2 and low-speed shaft 2' are at their proper values. When the device reaches a point of zero external secondary resistance for the motor, speed control may be secured by adjusting the frequency generated in the windings 34 of the exciter 35 by adjusting the speed of the device 53.

If the frequency of the current supplied from the windings 34 is maintained constant and the speed of rotation of the core 5 is constant, the speed reduction ratios between the high-speed shaft 2 and the low-speed shaft 2' are dependent upon the frequency of the current supplied from the winding 34, the ratio of the number of poles in the generator and in the motor, and the relative distribution of the winding connections. If the speed of rotation of the high-speed shaft 2 is decreased while all the other factors remain constant, there is an increasing ratio of speed reduction of the shaft 2' as the speed of the high-speed shaft 2 is reduced.

In considering the operation of the apparatus, it is convenient to deal with actual revolutions per minute of the components with respect to standstill. Calculations having to do with electrical power transfers must, however, be based on relative speeds of rotation of the electrical rotating field in the stator and of the two rotors which rotate at different rates and, preferably, in a direction opposite the direction of rotation of the stator field so as to utilize the reaction torque of the generator to assist in power transmission.

Let $f_1$ represent the frequency of the exciting current supplied to the stator winding 30 from the exciter winding 34 and let $p_1$ represent the number of poles formed by the stator winding. Then the speed of rotation (relative to standstill) of the synchronously excited field formed in the stator will be $$\frac{120 f_1}{p_1}$$

and such speed may be designated $N_1$.

Let $N_2$ represent the actual R. P. M. of the power input shaft 2 (relative to standstill) and its rotor 4; let $N_3$ represent the actual R. P. M. of the power output shaft 2' and its quill 17 (relative to standstill); and let $f_2$ represent the frequency of the secondary current of the motor.

Then the speed of the quill 17 relative to the stator field will be $N_1$ plus $N_3$ and synchronously will equal $$\frac{120 f_2}{p_1}$$

Since the machine is of induction type, it will not operate exactly at synchronous speed and there will be present the usual slip $s_1$ in amount depending upon the internal losses. Thus the actual relative motor speed will be $$N_1 \text{ plus } N_3 = \frac{120 f_2}{p_1} \times (1 - s_1)$$

Similarly the relative speed of the generator components will be $N_2$ minus $N_3$ and since the frequency of the current in the generator winding 22 is necessarily the same as that in the motor winding 25, then, allowing for generator slip $s_2$, $$N_2 \text{ minus } N_3 = \frac{120 f_2}{p_2} \times (1 \text{ plus } s_2)$$

The generator slip $s_2$ is in the opposite direction and slightly different in amount, from the motor slip $s_1$, hence, while the relative, actual speed of the motor is slightly slower than synchronous, that of the generator is slightly greater than synchronous.

If the ratio of relative slips of motor and generator $$\frac{(1 \text{ minus } s_1)}{(1 \text{ plus } s_2)}$$

be designated $k_2$ and the above equations solved for $N_3$, there results—

$$N_3 = \frac{N_2 p_2 k_2 \text{ minus } 120 f_1}{p_1 \text{ plus } p_2 k_2}$$

On the basis of this equation, suitable pole combinations and excitation frequencies $f_1$ may be selected to give a desired result. In practice, the slips $s_1$ and $s_2$ may generally be considered to become vanishingly small so that $k_2$ approaches unity, and in the limit—

$$N_3 = \frac{N_2 p_2 \text{ minus } 120 f_1}{p_1 \text{ plus } p_2}$$

At no load, the relative speeds will closely approximate this relationship where the excitation frequency, number of poles and rate of actual rotation of the rotor 4 are so coordinated that the value of $N_3$ in the above equation is greater than zero and the excitation frequency is greater than zero, viz., is not direct current.

In Fig. 5 we have plotted an illustrative group of straight lines derived from the foregoing equation to indicate the effects of various exciter frequencies and power input shaft speeds on the quill speed of a machine wound to form ten motor poles and four generator poles. In this graph, the R. P. M.'s of the power input shaft are plotted as abscissae and the R. P. M.'s of the quill are plotted as ordinates for various values of excitation frequency $f_1$.

From Fig. 5, it will be seen that changing the excitation frequency causes a very marked change in the speed ratio, and this variation in speed ratio is accomplished without slipping away energy in losses, such as occur in usual change speed devices.

Fig. 5 further shows that with a constant pole ratio and frequency the speed ratio increases as the R. P. M. of the power input shaft decreases, and vice versa. For example, if the power input shaft is rotated at 3000 R. P. M., an excitation frequency of 25 cycles causes the quill 17 to rotate at a no-load speed of 640 R. P. M. Increasing the excitation frequency to 60 cycles reduces the speed of the quill 17 to a no-load speed of 340 R. P. M. as indicated, with only the normal small values of slip. This illustrative change in excitation frequency changes the speed ratio from $$\frac{3000}{640} = 4.68 \text{ to } \frac{3000}{340} = 8.83$$

This is a very valuable operating characteristic not hitherto attainable in any simple manner. The normal values of slip for motor and generator will effect this ratio slightly, depending upon the internal losses of the machine components.

In Fig. 6 we have plotted an illustrative group of lines derived from the foregoing equation to indicate the variations in speed ratios attainable with a constant exciter frequency of 25 cycles applied to machines each having 4 pole generators but whose motor poles vary from 4 to 16. As will be observed from this diagram, the speed ratio of the power input shaft to the power output shaft is highest at low speeds in all cases, and an increased number of motor poles increases the speed ratio of the power input shaft to the power output shaft, particularly at high speeds of the power input shaft.

Reversing

By reversing the switch 39 and thereby reversing the direction of rotation of the excitation field in the stator core 27, the direction of rotation of the quill 17 may be reversed while the generator rotor 4 continues to rotate in the same direction as before within the required range of speed.

When the reversal of phase sequence in the motor armature causes the reversal of the quill 17 to follow the requirements of reversed excitation, the relation of the components is expressed by the formula $$N_{3r} = \frac{N_2 p_2 k_2 \text{ minus } 120 f_1}{p_1 \text{ minus } p_2 k_2}$$

or, in the limit $$N_{3r} = \frac{N_2 p_2 \text{ minus } 120 f_1}{p_1 \text{ minus } p_2}$$

This represents a condition of internal differential cascade and an overloaded condition as compared with the rotation of shafts 2 and 2' in the same direction, since during reversal the rotations of the two rotors are opposed. This temporary overload can usually be tolerated for short times and reduced loads ordinarily involved in reversing operations, or be compensated for by increasing the size and ruggedness of the parts.

As indicated by the diagram shown in Fig. 7, the effect of changing the excitation frequency during reversing is similar to the results shown in Fig. 5, but the speed ratios during reversing are lower than the forward ratios for this particular arrangement.

Our improvements provide a compact and relatively light apparatus for transmitting the available power of a prime mover operating at speeds up to or even above 10,000 R. P. M. to a low speed power output shaft at a ratio of reduction which increases as the speed of the prime mover is reduced and vice versa and without the use of slip rings, commutators or similar sliding contacts within the apparatus and to reverse the power output shaft and operate it at a different ratio without reversing the prime mover. The reduction ratios on both forward and reverse movements of the power output shaft are automatically increased as the prime mover speed decreases and may be varied by changing the exciter frequency applied to the motor.

Having described our invention, we claim:

1. Electrical apparatus comprising an induction generator, an induction motor concentric with said generator and a magnetizer connected with said motor for forming a rotating field therein at a frequency controllable independently of said generator, said generator including a rotatable member carrying conductors forming an inductive winding and a rotatable member carrying a polyphase winding in inductive relation to said conductors; said motor including a polyphase winding carried by said second member and rotatable with said first named winding and connected therewith in phase relation, and a stator carrying a stationary polyphase winding in inductive relation to the second named winding; and said magnetizer including an armature having polyphase windings connected in phase relation with the stationary winding of said motor.

2. Electrical apparatus comprising an induction generator, an induction motor concentric with said generator, and means electrically independent of said generator for forming a rotating field in said motor; said generator including conductors forming an inductive winding and a polyphase winding in inductive relation to said conductors and rotatable relatively thereto; said motor including a polyphase winding rotatable with said winding first named and a stationary polyphase winding in inductive relation to said second named winding; and said means including a polyphase winding connected in phase relation with one of the polyphase windings of said motor; and the other of the polyphase windings of said motor being connected in phase relation with the polyphase winding of said generator.

3. An electrical apparatus comprising an induction generator, an induction motor concentric with said generator, and means electrically independent of said generator for forming a rotating field in said motor to excite said motor and therethrough to excite said generator; said generator including a rotatable, magnetizable core having therein conductors forming an inductive winding and a rotatable, magnetizable core encircling said first named core and having seated therein polyphase windings in inductive relation to said conductors and wound to form poles; said motor including a rotatable, magnetizable core connected with and encircling said second named core and having seated therein polyphase windings electrically connected in phase relation with said first named windings, and a stationary, magnetizable core encircling said third named core and having seated therein a polyphase winding in inductive relation with said second named winding and electrically connected with said means; the magnetic fields of said first and second cores not being mutual to the magnetic fields of said third and fourth named cores.

4. Electrical apparatus comprising an induction generator, an induction motor concentric with said generator and a variable speed magnetizer driven independently of said generator and forming a rotating field in said motor; said generator including conductors forming an inductive winding and a rotatable polyphase winding in inductive relation to said conductors; said motor including a polyphase winding rotatable with said first named winding and connected therewith in phase relation, and a stationary polyphase winding in inductive relation to the second named winding; said magnetizer including an armature having polyphase windings connected in phase relation with the stationary winding of said motor; and a reversing switch interposed between the windings of said magnetizer and motor to reverse the direction of rotation of said motor field independently of said generator.

5. Electrical apparatus comprising an induction generator, an induction motor concentric with said generator, and means electrically independent of said generator and forming a field having rotating poles in said motor; said generator including conductors forming an inductive winding and a polyphase winding wound to form alternate poles in inductive relation to said conductors and rotatable relatively thereto; said motor including a polyphase winding wound to form poles and rotatable with said winding first named and a stationary polyphase winding wound to form poles in inductive relation to said second named winding; and said means including a polyphase winding connected in phase relation with one of the polyphase windings of said motor; the other of the polyphase windings of said motor being connected in phase relation with the polyphase winding of said generator, to form a closed circuit.

6. An electrical apparatus comprising an induction generator, an induction motor concentric with said generator, and means electrically independent of said generator and supplying polyphase current to said motor at a frequency represented by the symbol $f_1$ and forming a field in said motor to excite said motor and therethrough to excite said generator, said field rotating at a rate represented by the symbol $N_1$; said generator including a rotatable, magnetizable core rotatable at a rate represented by the symbol $N_2$ and having therein conducting bars and rings forming a squirrel cage and a rotatable, magnetizable core encircling said first named core and having seated therein polyphase windings in inductive relation to said bars and wound to form a number of poles whose number is represented by the symbol $p_2$; said motor including a rotatable, magnetizable core fixed to and encircling said second named core and having seated therein polyphase windings electrically connected in phase relation with said first named windings, and a stationary, magnetizable core encircling said third named core and having seated therein a polyphase winding forming a number of poles whose number is represented by the symbol $p_1$ in inductive relation with said second named winding and electrically connected with said means; the rate of rotation of said second and third named cores being represented by the symbol $N_3$; and the magnetic fields of said first and second cores not being mutual to the magnetic fields of said third and fourth named cores; said motor and generator having slips in opposite directions and whose ratio is represented by the symbol $k_2$; said apparatus operating in substantial accordance with the formula $$N_3 = \frac{N_2 p_2 k_2 \text{ minus } 120 f_1}{p_1 \text{ plus } p_2 k_2}$$

when the rotatable cores are all turning in the same direction and $N_3$ has a value above zero.

THOMAS D. BOWES.
FRED SCHULTE.
CHARLES C. HUTCHINS.

REFERENCES CITED

The following references are of record in the file of this patent:

UNITED STATES PATENTS

| Number | Name | Date |
|---|---|---|
| 912,144 | Mavor | Feb. 9, 1909 |
| 1,836,298 | Winther | Dec. 15, 1931 |
| 1,848,091 | Winther | Mar. 1, 1932 |
| 2,170,836 | Smith | Aug. 29, 1939 |
| 2,465,006 | Bowes | Mar. 22, 1949 |